UNITED STATES PATENT OFFICE.

JOHANN HAMMERSCHLAG, OF STRASSBURG, GERMANY.

PROCESS OF PREPARING MANURE.

No. 838,108.        Specification of Letters Patent.        Patented Dec. 11, 1906.

Application filed October 15, 1902. Serial No. 127,425.

*To all whom it may concern:*

Be it known that I, JOHANN HAMMERSCHLAG, director, a subject of the King of Prussia, German Emperor, residing at Strassburg, Alsace, in the Empire of Germany, have invented new and useful Improvements in Processes of Preparing Manures, of which the following is a specification.

This invention relates to improvements in the manufacture of fertilizers and artificial manures; and it is intended to devise means for converting and keeping the fertilizing constituents of such compounds in a soluble state and for preventing their reversion, by which means the fertilizing and plant-nourishing value of the compound is increased and they are converted into a state which allows of their easy adaptability and of their being stored for any length of time and of being shipped without damage.

The rather slight solubility of the fertilizer compounds renders their action very unreliable if it is intended to make them available for the next crop. For this reason manufacturers have been trying to convert the valuable constituents of the raw materials which enter into the composition of the fertilizers into soluble or easily-available compounds, while at the same time avoiding to render the final product strongly acid or alkaline, inasmuch as fertilizers exhibiting such decided reactions, and in particular those having an acid reaction, have been found to cause considerable damage to the soil and to the crop.

I have discovered that an artificial manure of very increased fertilizing or crop-raising value and without detrimental effects, both upon the soil and the plants, may be obtained by a certain treatment of humic acid with alkalies and suitable salts and minerals, such as phosphates, silicates, and the like. Humic acid and its allied substances which occur in soil are capable of dissolving silicic acid and its salts on being submitted to the treatment about to be described and t undergo decompositions whereby compounds are formed which retain their solubility for any length of time. The same effect is produced by the treatment with humic acid of phosphates in place of or in combination with silicic acid and its salts. Both the solutions of humic acid as well as the solutions of the compounds of the humic acid with silicic acid or with its salts are also capable of dissolving natural phosphates, whereby the valuable fertilizing agents are rendered available and made soluble and converted into a state in which they will be easily absorbed by the plants.

Where I make mention of "humic acid" in the specification this term includes the putrefied decayed vegetable or animal matters which result from the slow decomposition of animal, and in particular vegetable, material and which are soluble in water with the addition of alkalies or ammonia, such matters occurring in large quantities in brown coal, lignite, peat-bog, forest earth, humus, and the like. The term "humic acid" as used in the specification is to include also those substances which are designated as "humine acid," "ulmic acid," "ulmine," "geic acid," "kreine acid," "kreic acid," "kreine," "apokreine acid," and allied substances which are obtained from the above-mentioned materials or which are intermediate products of decomposition. Also soot which is the product of dry distillation of carboniferous material yields, if treated in the same manner as decayed or putrefied vegetable or animal materials, a solution of humic acid. Humic acid may also be obtained by treatment of carbon with acids, and with nitric acid in particular.

The preparation of the solution of humic acid is effected by treating any one of the above-mentioned materials or a mixture of any of the same with a cold or hot aqueous solution of caustic alkali, (KOH, NaOH,) ammonia, ($NH_3$,) or with the corresponding carbonates of the same ($K_2CO_3$, $Na_2CO_3$, $(NH_4)_2CO_3$) in a suitable manner by pressure, if necessary, the materials having been mixed to the consistency of a paste. Peat, bog, forest earth, lignite, soot, or other substances rich in carbon are suitable for the purpose. The above-mentioned alkaline solutions may be replaced by other substances containing free alkali and not interfering otherwise with the action of fertilizers. Thus I may use, for instance, the so-called "soluble" glass for effecting the solution. By this treatment the major part of the carboniferous material is changed so as to become soluble in water. The thus-obtained soluble humic acid may be poured off, filtered, or squeezed out, and the resultant liquid may then be evaporated and dried. It is immaterial for the fertilizing action whether the soluble constituents are admixed in the form of a paste or as a dry powder or combined with insoluble substances.

As an instance of carrying my invention into effect, I may mention the following relative proportions of materials which I have found to be suitable for most purposes. Thus I may use one hundred parts of marsh earth containing about twenty-five per cent. of solid matter, of which latter one-half consists of humic acid. For every one hundred parts of dry humic acid I may use seventeen parts of caustic potash, (KOH.) Instead of potash I may use equivalent proportions of other alkalies—thus, for instance, of caustic soda, 12.1 parts of caustic soda corresponding to seventeen parts of caustic potash, ($56.16:40.06 = 17:x$; $x = 12.1$.) These proportions can of course be somewhat varied, according to the properties of the material submitted to the treatment. The right proportions will always have to be found out by experiments in each particular case, and the amount of water to be used will also have to be ascertained by experiments. In the above instance I have found a proportion of one thousand parts of water for every two hundred and fifty parts of dry bog to be best suited for the purpose. This treatment of the above-enumerated materials, which are rich in carbon, the rendering available of the same by means of alkaline liquids, the extraction of the humic acid by dissolution, the separation of the liquid by filtration, squeezing off, evaporating, drying, and pulverizing constitutes the first step of the process for the manufacture of a fertilizer in accordance with my invention.

The striking and very valuable properties of the thus-obtained solution of humic acid are then utilized for the manufacture of an improved fertilizer or artificial manure in which the soluble and dissolved components are contained in such a state as to retain their solubility, the product presenting the further advantage of preserving its physical condition, even on being stored for a long time and after having been shipped to countries beyond the sea, so that it will not acquire a hard and stone-like appearance, but retains the valuable properties of fertilizers in general—that is to say, the property of being easily strewn and distributed and spread, upon which property its adaptability for many purposes will chiefly depend. The further treatment of the compound thus obtained is effected by intimately mixing the humic-acid solution produced either in form of a filtrate or in admixture with the undissolved portion of the bog which has been rendered available with silicates and compounds or mixtures of which silicates form a part. These materials are employed in a finely-powdered condition, the mixture or the dissolving being effected either cold or at an elevated temperature and, if required, under pressure.

A suitable quantity of water has to be present, such as is required for the dissolving of the newly-formed combination of the silicates with humic acid, for which purpose the amount of water present in the process of converting the humic acid will generally be sufficient. After the decomposition and the solution has been finished, which sometimes may take several days, the solution is squeezed out, evaporated, and dried, or the entire mass containing a mixture of dissolved and undissolved material is dried, powdered, and sifted. In this case also the amount of silicates or silicic acid to be added will depend on various circumstances. In the above-mentioned example I have found thirty parts, by weight, of silicate of potash as an addition to one hundred parts, by weight, of the solids of converted humic acid, which solids are to be computed from the above-mentioned data, to be suitable for the purpose.

In manufacturing this fertilizing material the use of silicates of alkalis, silicate of potash, silicate of sodium, soluble glass will chiefly suggest itself; but by varying the working conditions accordingly as regards degree of heat, pressure, and duration of treatment other silicious material—such as infusorial earth or kieselguhr, which are more readily attacked—may be used.

After the solution of the silicates the new compound which the silicates have formed with the humic acid retains its easy solubility even on prolonged drying. The silicates are thereby converted into entirely new compounds, which are made up of materials rich in carbon, such as peat, and which are rendered available by treatment with alkali and of silicates, and the new compounds also contain humous silicic-acid compounds and are exceedingly valuable on account of their easy and lasting solubility. This will appear from the following statement: Upon precipitating the silicic acid of a silicate in solution by means of acids and then submitting the precipitate to a prolonged drying process the silicic acid becomes insoluble, while the new compound obtained in the manner above described, and which contains dissolved humic acid and dissolved silicic acid, upon being precipitated by acids leaves a residue, which is always readily and completely soluble in water even upon prolonged drying at a high temperature, which proves that the silicic acid has been changed into a new compound.

Silicic acid is sometimes used as a fertilizing material in form of silicates. It will even become available; but its adaptability is diminished by the facts that the silicates of alkali frequently, even after a short time already, become hard as a rock and insoluble and form lumps and stone-hard masses, and they are thus changed into a state where their availability becomes impossible by their physical condition. All these inconveniences are overcome by the valuable properties of the new product as above set forth.

By the above-mentioned solution of humic acid also natural phosphates may be converted and rendered soluble, as I have found by experiment. For this purpose powdered phosphates—such as Thomas flour, powdered Thomas slag, guano, phosphorit, bone-meal, bone-ash, and the like—are mixed with the strongly-concentrated alkaline solution of humic acid, as above described, in the proportion of one part, by weight, of phosphate and two parts, by weight, of humate, and the mixture is then allowed to stand for some time in the cold or at an elevated temperature and, if desired, under pressure. A decomposition will now take place, by which the phosphate is rendered available.

As a further instance of carrying out my invention I may mention the following: Fresh bog earth containing about twenty-five per cent. of dry substance is mixed with an amount of caustic alkali equal to seventeen per cent. of said dry substance and which is dissolved in thirty-four parts of water. The mixture is rubbed up with the addition of further small quantities of water, so as to form a thin paste. The converted humic acid is thus rendered soluble. The solution which is separated from the remaining solids is evaporated to syrupy consistence and is mixed with one-third of phosphate, for instance, with powdered Thomas slag, by which means a stiff jelly-like mass is formed, which solidifies after having been kept for several days at an elevated temperature. By then adding water, stirring up, separating from the insoluble and evaporating the solution, crystals of a phosphor-humic-acid compound are obtained. This compound will be manufactured on a large scale only as an exception for the purpose of manufacturing fertilizers; but this decomposition is effected directly with the already-treated materials which are rich in carbon and with the phosphates, and the product obtained is used for fertilizing purposes. The above-mentioned example, however, will be illustrative of the fact that the decomposition takes place. This manner of treatment will also prevent the already-available phosphoric acid to become insoluble again or to be "reverted," as it is usually called. The powdered phosphates may also be mixed with the solution of compounds of the humic and silicic acid and may be made available by these means so as to form fertilizing materials which contain humic acid, silicic acid, and phosphoric acid at the same time and in a readily-absorbable state.

Wherever it should be required to suit certain conditions and for obtaining certain results, the following materials may also be incorporated with the mass: Carbonate of magnesia, silicate of magnesia, crude and purified silicate of potash, magnesia and sulfite of magnesia, kainite, karnalite, sulfates, nitrates, and phosphates of alkalis and of ammonia, and of the alkaline earth, apatit, silicate of ammonia, soluble phosphates, such as superphosphate, double superphosphate, available raw phosphates, guano, bone-meal, and the like, animal refuse, such as hair, horn, blood, powdered meat, and the like.

The fertilizing materials manufactured in the manner above described are easily soluble and assimilable. A great proportion of the ingredients for nourishing the plant has already been converted into the state of humus during the dissolving and mixing process, while another part is converted while the material is kept in store up to the final conversion into the finished product, whereby the objectionable strong caustic properties become obliterated in the very mild humic-acid combination rich in carbon. For this reason such fertilizing materials may be applied at any time with a perfect reliability even upon very delicate plants by strewing, spreading, pouring, and the like. If saltpeter, for instance, is used as a fertilizing material, the permissible quantity of the substance is comparately small, inasmuch as a larger quantity would destroy the roots of the plants; but if saltpeter is employed in mixture with the solution of humic acid six times as much of saltpeter may be used with the humic acid for the same surface of soil to be treated without any harm being done to the roots of the plants. By this means valuable and cheap fertilizing materials in large quantities may be used on the plants, whereby the fertilizing action of the artificial manure is still further increased.

What I claim as my invention, and desire to secure by Letters Patent of the United States, is—

1. The process of manufacturing a fertilizer which consists in treating humine with solutions of alkaline metal bases, adding silicates of alkali and phosphates, and drying and comminuting the product, substantially as described.

2. The process of manufacturing a fertilizer, which consists in treating humine with solutions of alkaline metal bases at an elevated temperature, adding silicates of alkali and phosphates, and drying and comminuting the product, substantially as described.

3. The process of manufacturing a fertilizer, which consists in treating humine with solutions of alkaline metal bases at an elevated temperature and under pressure, adding silicates of alkali and phosphates, and drying and comminuting the final product, substantially as described.

In witness whereof I have hereunto signed my name in the presence of two subscribing witnesses.

JOHANN HAMMERSCHLAG.

Witnesses:
 GUSTAV SCHWEISS,
 MARTHA L. BRITTAIN.